United States Patent [19]

Elter et al.

[11] Patent Number: 4,778,646

[45] Date of Patent: Oct. 18, 1988

[54] GAS COOLED HIGH TEMPERATURE REACTOR CHARGED WITH SPHERICAL FUEL ELEMENTS

[75] Inventors: Claus Elter, Bad Durkheim; Jurgen Rautenberg, Stettfeld; Josef Schoening, Hambrucken; Wilfried Stracke, Oftersheim, all of Fed. Rep. of Germany

[73] Assignee: Hochtemperatur-Reaktorbau GmbH, Fed. Rep. of Germany

[21] Appl. No.: 760,414

[22] Filed: Jul. 30, 1985

[30] Foreign Application Priority Data

Aug. 1, 1984 [DE] Fed. Rep. of Germany ....... 3428340

[51] Int. Cl.$^4$ .................................. G21C 19/28
[52] U.S. Cl. .................... 376/265; 376/286; 376/291; 376/381
[58] Field of Search ............... 376/264, 265, 286, 291, 376/292, 381, 383, 285, 266

[56] References Cited

U.S. PATENT DOCUMENTS

| | | | |
|---|---|---|---|
| 3,034,689 | 5/1962 | Stoughton et al. | 376/265 |
| 4,047,742 | 9/1977 | Hoferkamp et al. | 376/286 |
| 4,118,276 | 10/1978 | Hodzic et al. | 376/291 |
| 4,302,293 | 11/1981 | Elter et al. | 376/381 |
| 4,312,704 | 1/1982 | Schror et al. | 376/266 |

FOREIGN PATENT DOCUMENTS

| | | |
|---|---|---|
| 2449429 | 4/1976 | Fed. Rep. of Germany . |
| 2449430 | 4/1976 | Fed. Rep. of Germany . |
| 3030510 | 3/1982 | Fed. Rep. of Germany . |
| 3121379 | 12/1982 | Fed. Rep. of Germany . |
| 3404905 | 8/1985 | Fed. Rep. of Germany . |

Primary Examiner—Deborah L. Kyle
Assistant Examiner—Richard L. Klein
Attorney, Agent, or Firm—Robert J. Koch

[57] ABSTRACT

The invention relates to a gas cooled high temperature reactor located in the cavity of a pressure vessel, with spherical fuel elements, and removal apparatus for fuel elements. The latter is made of at least one ceramic pebble outlet tube extending through the graphite structural parts of the nuclear reactor (bottom reflector, bottom layers) and a number of metal pebble outlet tubes installed through the bottom of the pressure vessel. They are arranged coaxially in the liner of the passage through the vessel. To be able to dismantle the metal pebble outlet tubes, they are constructed of several releasably interconnected tube segments. Between the uppermost tube segment and the corresponding ceramic pebble outlet tube a compensating tube is provided and connected with the tube segment by means of a sliding joint. The other end of the compensating tube is fastened to the thermal bottom shield. Relative movements caused by the thermal expansion of the bottom shield and the pebble outlet tubes are compensated by the slide joints. Simultaneously, the necessary tight sealing is assured.

18 Claims, 3 Drawing Sheets

GAS COOLED HIGH TEMPERATURE REACTOR CHARGED WITH SPHERICAL FUEL ELEMENTS

BACKGROUND OF THE INVENTION

1. Field of the Invention

The invention relates to a gas cooled high temperature reactor charged with spherical fuel elements, housed in a prestressed concrete pressure vessel having a cavity clad with a liner. A reflector surrounds the pile of fuel elements on all sides, and a hot gas collector chamber is located under the bottom part (bottom reflector) of the reflector. The hot gas collector chamber is bounded in the downward direction by the graphite blocks of the bottom layers of the high temperature reactor. A thermal bottom shield and a core support space is located between the thermal bottom shield and the bottom liner of the cavity, together with means to add and to remove the spherical fuel elements. The means to remove fuel elements comprises at least one ceramic pebble outlet tube passing through the bottom reflector and the bottom layers and one metal pebble outlet tube located under the bottom layers.

2. Description of the Prior Art

High temperature reactors are known from West German Offenlegungsschrift No. 30 30 510. Spherical fuel elements may be added to and removed from the core continuously after their depletion. The nuclear reactor has very high gas temperatures in its lower part. The bottom reflector, the bottom layers, and the part of the pebble outlet apparatus located within the core structure are constructed of highly heat resistant material. These structural parts are made of a ceramic material, such as graphite, which has a limited degree of tensile and bending strength. The part of the pebble outlet apparatus located outside the thermal bottom shield, which connects the ceramic outlet tubes with an isolator and subsequent scrap separator each, is made of metal to increase its mechanical strength. Preferably, an austenitic material is used, as there is a high neutron flux in the area concerned.

The state of the art is represented by an outlet tube for spherical fuel elements described in West German Offenlegungsschrift No. 31 21 379. The outlet tube is conducted through the bottom of the prestressed concrete pressure vessel in a passage lined with an armored tube. In order to make possible accurate installation of the outlet tube in the armored tube and subsequent levelling, the outlet tube is fastened to the armored tube at its upper end by means of a special suspension which extends above the bottom of the pressure vessel. This suspension further allows for compensation of the different thermal expansions of the outlet tube and the armored tube.

West German Offenlegungsschrift No. 24 49 430 is further cited as representing the state of the art, it also concerns the compensation of the thermal movements of two interconnected structural parts. These two structural parts are partial segments of a pipeline exposed to high pressure and high temperatures, joined together by means of a sliding joint operating on the principle of piston rings.

SUMMARY OF THE INVENTION

Based on this state of the art, it is an object of the invention to develop an outlet apparatus for the fuel elements of the aforedescribed high temperature reactor so that the tightness of the metal pebble outlet tubes, primarily at its joints with the ceramic pebble outlet tubes, against internal and external pressures is assured, even in the case of thermal movements of the structural parts to be connected. It should further be possible to dismantle the metal pebble outlet tubes in the course of a reactor inspection and to replace them.

According to the invention, each metal pebble outlet tube is installed coaxially in a passage clad with a liner in the bottom of the pressure vessel, composed of a plurality of releasably interconnected tube segments. A compensating tube passing through the core support space and fastened to the thermal bottom shield is provided for each of the metal pebble outlet tubes, the compensating tube being joined at its upper end to the ceramic pebble outlet tube and at its lower end to the metal pebble outlet tube. A sliding joint, connects the compensating tube and the metal pebble outlet tube.

The arrangement of compensating tubes with a sliding joint between the ceramic and the metal pebble outlet tubes results in compensating for the horizontal displacements of the openings of the pebble outlet tubes in the thermal bottom shield. This is in relation to the openings of the pebble outlet tubes in the bottom of the pressure vessel. The displacements are caused by the heating of the thermal bottom shield during operation and compensating for vertical thermal expansion of the metal pebble outlet tubes. The use of sliding joints simultaneously insures the necessary tightness.

The division of the metal pebble outlet tubes into several tube segments and the installation of the outlet tubes within the bottom of the reactor pressure vessel in an outer tube, the liner of the passage, make it possible to remove a damaged metal pebble outlet tube, if necessary, from below after the core has been emptied.

Advantageous further developments of the invention will become apparent for the dependent claims and the description below of an embodiment with reference to the schematic drawings.

DETAILED DESCRIPTION OF THE PREFERRED EMBODIMENT

Figure 1:
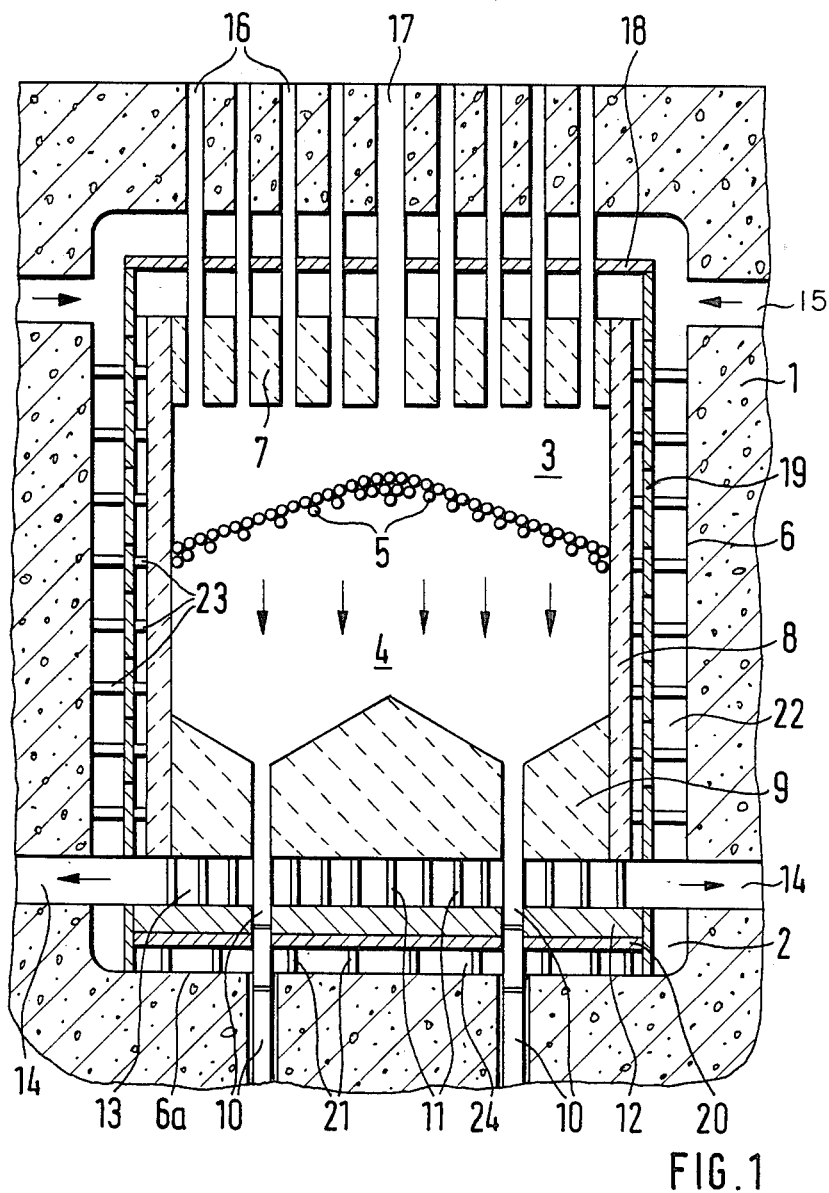
FIG. 1 shows a vertical section through a high temperature reactor according to the invention in a strongly simplified view.

FIG. 1 shows a prestressed concrete pressure vessel 1, comprising a cavity 2 in which a high temperature reactor 3 is installed. Heat exchangers and blowers (not shown) are housed in other cavities. The core 4 of the high temperature reactor 3 consists of a pile of fuel element pebbles 5 and delivers an output capacity of 600 to 1200 MWe. The cooling gas, helium, flows from top to bottom through the pile. The cavity 2 is lined with a metal liner 6.

The core 4 is surrounded on all sides by a graphite block reflector comprising a roof reflector 7, a cylindrical side reflector 8 and a bottom reflector 9. The bottom reflector 9, also forms the core support bottom and comprises a pebble outlet apparatus 10 of four ceramic and four metal pebble outlet tubes. It rests on the columns 11 on the bottom layers 12, which together with the bottom reflector 9, define a hot gas collector chamber 13. This is followed by horizontal hot gas conduits 14, leading to the heat exchangers. Cold gas conduits 15 open into the upper area of the cavity 2, whereby the cooled and compressed helium is returned to the high temperature reactor 3.

The roof of the prestressed concrete pressure vessel 1, together with the roof reflector 7, comprises a plurality of passages 16, in which absorber rods are guided to regulate and shut down the core 4. Another passage forms the pebble addition tube 17.

The reflector is surrounded on all sides by a metal thermal shield consisting of the roof shield 18, the side shield 19 and the bottom shield 20. The bottom shield 20 is supported by the columns 21 on the bottom of the pressure vessel. The bottom shield 20 together with the bottom liner 6a define the core support piece 24, in which the columns 21 are erected. The thermal side shield 19 is arranged in an annular space 22, which is limited by the liner 6 and the side reflector 8 and wherein the circulating cold gas is returned from the cold gas conduits 15 to the core 4. In the annular space 22 a support structure 23 is provided for the side reflector 8, said support structure comprises a plurality of individual elements which transfer forces from the core 4 into the liner 6 and thus to the prestressed concrete pressure vessel 1.

Figures 2, 3:
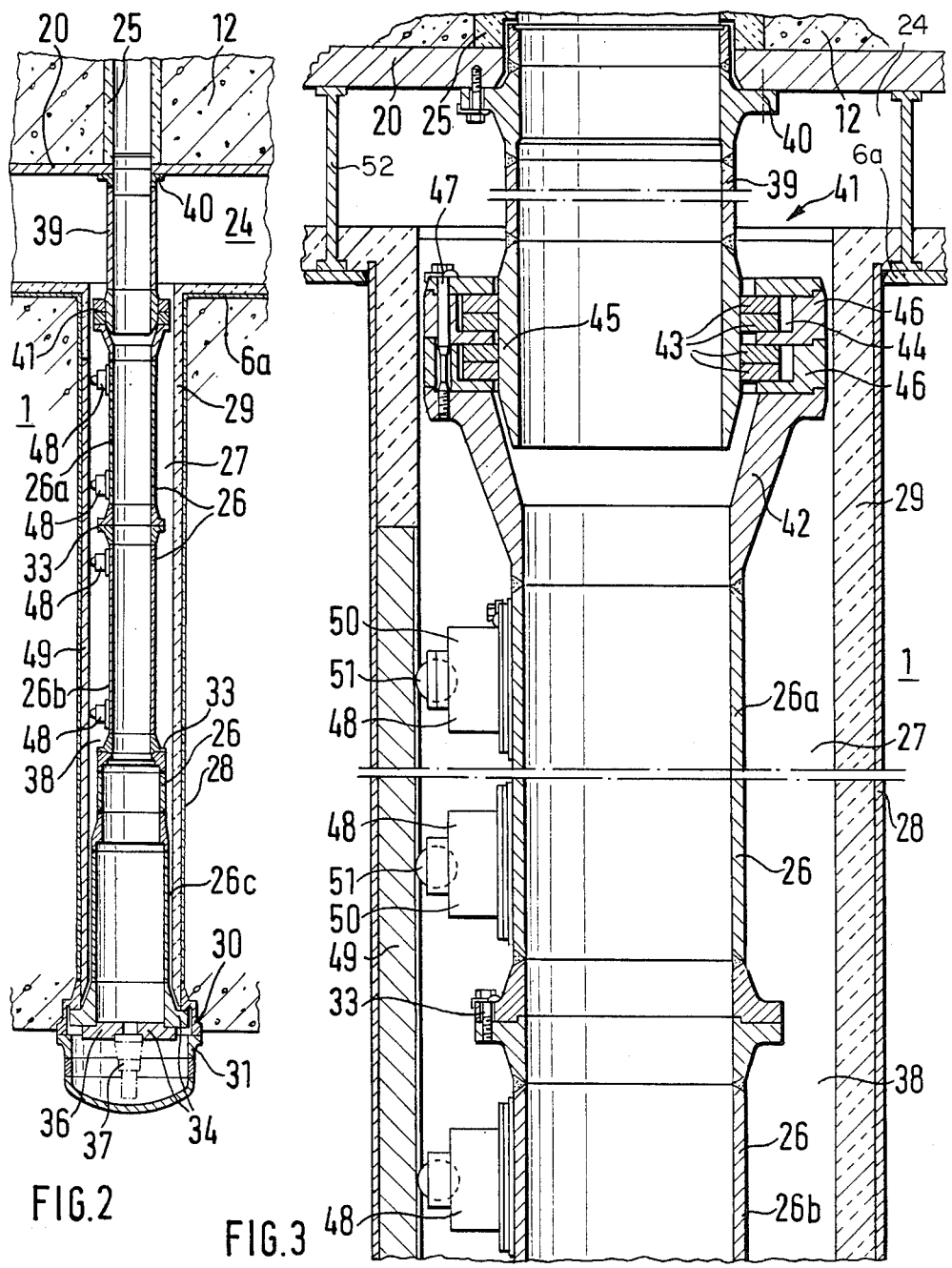
FIG. 2 shows a section of the pebble outlet tube of the high temperature reactor shown in FIG. 1 at a larger scale.
FIG. 3 shows the upper part of the pebble outlet apparatus shown in FIG. 2, again at a larger scale.
Figure 4:
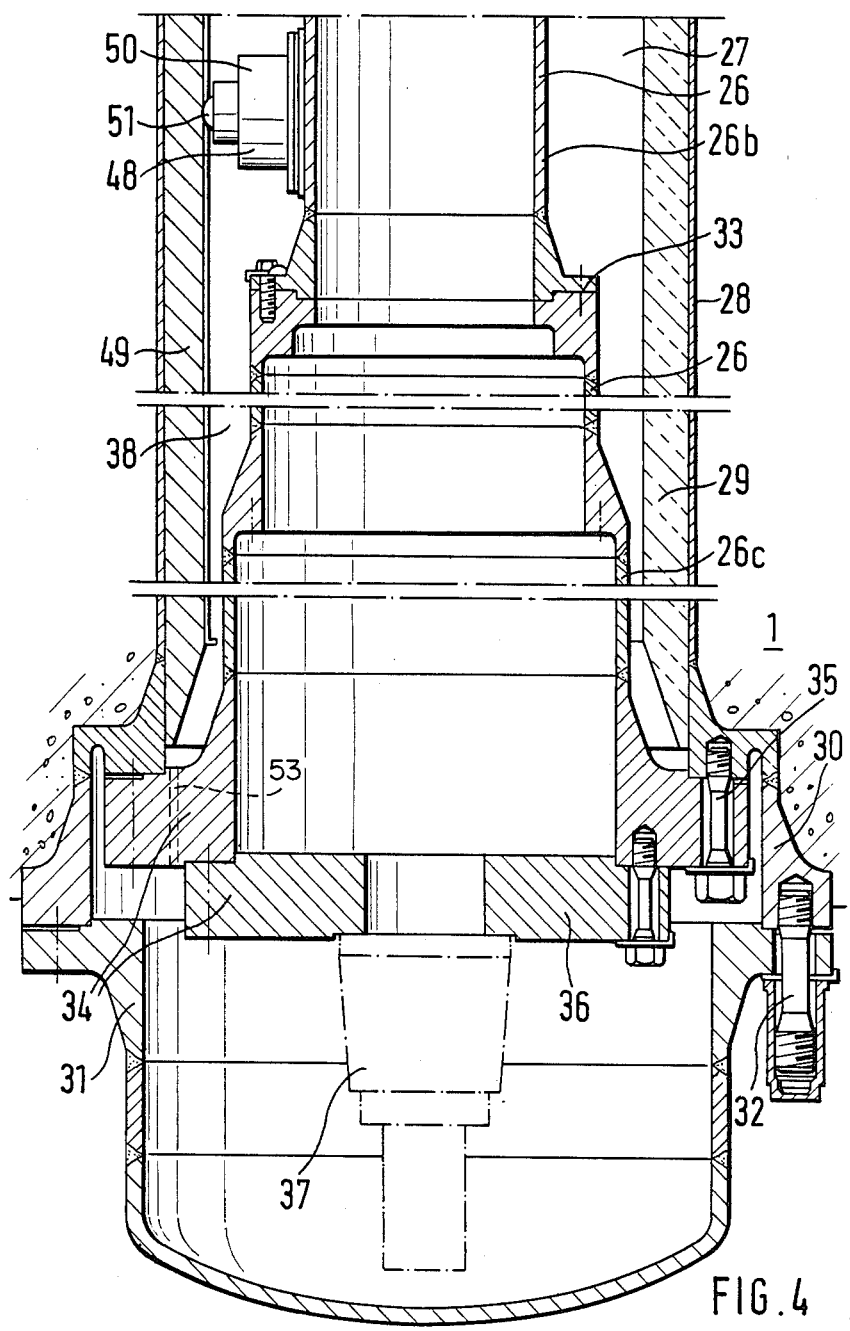
FIG. 4 shows the lower part of the pebble outlet apparatus shown in FIG. 2 at the scale of FIG. 3.

FIGS. 2, 3 and 4 show a portion of the pebble outlet apparatus 10 consisting of four parts, a ceramic outlet tube 25 and a metal outlet tube 26 comprising three portions.

The ceramic outlet tube 25 connects on top with a funnel formed in the bottom reflector 9 and penetrates through the bottom reflector 9, the hot gas collector chamber 13, and the bottom layers 12, as seen in FIG. 1.

The metal outlet tube 26 is conducted within a passage 27 through the bottom of the prestressed concrete pressure vessel 1. The passage 27 is clad with a metal liner 28, in which the outlet tube 26 is installed freely and coaxially. The liner 28 is equipped with thermal insulation 29. The liner 28 expands toward the outside to form a flange 30, to which by means of retaining bolts 32 a cover lid 31 is fastened. At its upper end the liner 28 is welded to the bottom liner 6a of the cavity 2.

The metal pebble outlet tube 26 consists of three tube segments 26a, 26b and 26c, joined together by the flange connections 33. This renders the dismantling and replacement of the metal outlet tube 26 possible.

The bottom tube segment 26c expands downward in steps and is equipped with a vessel closure 34, screwed by means of retaining bolts 35 to the suitably shaped flange 30 fo the liner. Part of the vessel closure 34 is formed by a plate 36, provided as a support surface for an isolator to be installed in the lowest tube segment 26c, for the spherical fuel elements. The isolator is not shown, while the drive mechanism 37 for the isolators is indicated in FIGS. 2 and 4. In the West German application No. P 34 04 905.3, the disclosure of which is incorporated herein, an isloator of this type is described, together with a fragment separator connected to it.

The vessel closure 34, i.e. its flange like part, may comprise several viewing orifices 53 providing access to the annular space 38 between the liner 28 and the pebble outlet tube 26. A camera may be introduced through said orifices, so that the external wall of the metal outlet tube 26 and the cover of the thermal insulation 29 may be readily inspected.

In order to make possible the compensation of relative thermal movements of the ceramic outlet tube 25 (installed fixedly in the thermal bottom shield 20) and of the metal outlet tube 26 (installed fixedly in the bottom of the prestressed concrete pressure vessel 1) in the horizontal direction and also to compensate for vertical thermal displacements of the metal outlet tube 26 in relation to the liner 28, a metal compensating tube 39 is inserted between the two outlet tubes 25 and 26, said tube 39 being fastened by means of a flange connection 40 to the thermal bottom shield 20 and with its upper end inserted into the ceramic outlet tube 25. Its lower end is connected by means of a sliding joint 41 with the metal outlet tube 26.

The sliding joint 41 operates by the piston ring principle, as shown in FIG. 3. On the uppermost tube segment 26a of the metal outlet tube 26 a conically expanding tubular piece 42 is provided in the shape of a piston ring holder and comprises a plurality of piston rings 43, located in pairs adjacent to each other, in a groove. The piston rings 43 are divided into segments, each of which is pressured by a helical spring 44 radially onto the lower end of the compensating tube 39 serving as the slide tube 45. The holding elements 46 for the piston rings 43 are composed of several parts held by bolts 47.

In order to prevent the flow of fuel element pebbles into the core support space 24 and the annular space 38, in the event of a fracture of the compensating tube 39, a second coaxially placed tube 52 may be arranged around the compensating tube 39, to serve as a trap.

Elastic support elements 48 are applied to the two tube elements 26a and 26b in a uniform distribution over the circumference of the metal outlet tube 26 whereby the outlet tube 26 is resting on the liner 28. Six such support elements are provied for each of the two tube segments 26a and 26b, with three each being located in a horizontal plane. The support elements of the two planes occupy the same circumferential position. Vertical guide rails 49 are mounted on the liner 28 at these circumferential positions, with the thermal insulation eliminated at these locations.

The outlet tube 26 may be centered and guided by means of the elastic support elements 48 on the guide rails 49. The support elements perform the function of insuring that the metal outlet tube 26 may be installed and dismantled even after potential displacements of the concrete and warping of the liner 28. They serve additionally to compensate the acceleration forces that may become active during earthquakes.

The elastic support elements 48 comprise a housing 50, in which several parallel helical springs are arranged, a roller 51 and their bearings. West German Offenlegungsschrift No. 24 49 429, the disclosure of which is incorporated herein, describes a support element of this type.

What is claimed is:

1. A gas cooled reactor, having a core of spherical fuel elements, housed in a cavity clad with a liner including a bottom liner, said core of fuel elements being surrounded by a reflector including a bottom reflector, the area between the bottom reflector and the bottom liner is made up of, in layered fashion from the reflector, a hot gas collection chamber, a bottom layer, a thermal bottom shield, and a core support space, said reactor further including means for removal of the fuel elements, said means comprising:

at least one ceramic outlet tube penetrating through the bottom reflector and bottom layers;

a compensating tube connected at its upper end to the ceramic outlet tube, said compensating tube is fastened to the thermal bottom shield passing through the core support space;

a metal outlet tube, arranged coaxially in a passage with a passage liner, located under the bottom layer and extending into the pressure vessel, said metal outlet tube is made up of a plurality of releasably connected tube segments; and a slide joint means for connecting a lower end of said compensating tube to said metal outlet tube.

2. A gas cooled reactor as in claim 1 wherein said slide joint comprises:

a slide tube connected to said compensating tube and means for sealing the joint made up of a piston ring seal connected to said slide tube and a piston holder shaped tubular piece connected to said metal outlet tube.

3. A gas cooled reactor as in claim 2, wherein said metal outlet tube is supported by elastic support elements uniformly distributed over its circumference and located at different heights on the liner of the passage through the vessel.

4. A gas cooled reactor as in claim 3, further comprising vertical guide rails mounted on the liner of the passage, said guide rails having the same circumferential positions as the support elements and on which the said support elements are centered.

5. A gas cooled reactor as in claim 4, further comprising support elements at each height, said elements being fastened to the tube segments.

6. A gas cooled reactor as in claim 5 wherein the liner of the passage further comprises thermal insulation which is interrupted at the locations of the vertical guide rails.

7. A gas cooled reactor as in claim 1 wherein said metal outlet tube is supported by elastic support elements uniformly distributed over its circumference and located at different heights on the liner of the passage through the vessel.

8. A gas cooled reactor as in claim 7, further comprising vertical guide rails mounted on the liner of the passage, said guide rails having the same circumferential positions as the support elements and on which the said support elements are centered.

9. A gas cooled reactor as in claim 8, further comprising three support elements at each height, said elements beign fastened to the tube segments.

10. A gas cooled reactor as in claim 9 wherein the liner of the passage further comprises thermal insulation which is interrupted at the locations of the vertical guide rails.

11. A gas cooled reactor as in claim 1, further comprising a trap tube mounted coaxially around said compensating tube.

12. A gas cooled reactor as in claim 1 wherein the lower tube segment is expanded in a downward stepwise fashion and operates as a receptacle for said fuel elements.

13. A gas cooled reactor as in claim 12 wherein said metal outlet tube further comprises means for vessel closure located at the end of the lower tube segment and retaining bolts for fastening said means for vessel closure to said passage liner.

14. A gas cooled high temperature reactor according to claim 13 wherein said vessel closure further comprises a plurality of viewing orifices leading into annular spaces between said metal pebble outlet tubes and said passage liners.

15. A gas cooled high temperature reactor according to claim 13 wherein said passage liner is closed off by a cover lid, said cover lid being fastened to the passage liner by means of retaining bolts.

16. A gas cooled reactor as in claim 1 wherein said metal outlet tube further comprises means for vessel closure located at the end of the lower tube segment and retaining bolts for fastening said means for vessel closure to said passage liner.

17. A gas cooled high temperature reactor according to claim 16 wherein said vessel closure further comprises a plurality of viewing orifices leading into annular spaces between said metal pebble outlet tubes and said passage liners.

18. A gas cooled high temperature reactor according to claim 16 wherein said passage liner is closed off by a cover lid, said cover lid being fastened to the passage liner by means of retaining bolts.

* * * * *